United States Patent
Schneider et al.

(10) Patent No.: US 10,903,614 B2
(45) Date of Patent: Jan. 26, 2021

(54) METHOD AND DEVICE FOR SEALING CONTACT POINTS AT ELECTRICAL LINE CONNECTIONS

(71) Applicant: PKC SEGU SYSTEMELEKTRIK GMBH, Barchfeld (DE)

(72) Inventors: Michael Schneider, Bad Salzungen (DE); Sebastian Konietzko, Bad Salzungen (DE)

(73) Assignee: PKC SEGU SYSTEMELEKTRIK GMBH, Barchfeld (DE)

( * ) Notice: Subject to any disclaimer, the term of this patent is extended or adjusted under 35 U.S.C. 154(b) by 150 days.

(21) Appl. No.: 15/999,483

(22) PCT Filed: Feb. 10, 2017

(86) PCT No.: PCT/EP2017/053019
§ 371 (c)(1),
(2) Date: Aug. 20, 2018

(87) PCT Pub. No.: WO2017/140592
PCT Pub. Date: Aug. 24, 2017

(65) Prior Publication Data
US 2019/0221981 A1    Jul. 18, 2019

(30) Foreign Application Priority Data
Feb. 19, 2016    (DE) .................. 10 2016 102 948

(51) Int. Cl.
*H01R 43/00* (2006.01)
*H01R 43/02* (2006.01)
(Continued)

(52) U.S. Cl.
CPC ........... *H01R 43/005* (2013.01); *H01R 4/022* (2013.01); *H01R 4/72* (2013.01); *H01R 4/723* (2013.01); *H01R 43/0242* (2013.01)

(58) Field of Classification Search
CPC ....................................................... H01R 4/72
(Continued)

(56) References Cited

U.S. PATENT DOCUMENTS 3,923,585 A * 12/1975 Vouillemin ............ B65D 35/08
156/379.9
4,845,309 A 7/1989 Vincent et al.
(Continued)

FOREIGN PATENT DOCUMENTS

DE    38 71 607 T2    12/1992
DE    693 24 913 T2    1/2000
(Continued)

OTHER PUBLICATIONS

International Preliminary Report on Patentability dated Jan. 22, 2018 issued in connection with corresponding International Application No. PCT/EP2017/053019 (10 pages total)
(Continued)

*Primary Examiner* — Scott W Dodds
(74) *Attorney, Agent, or Firm* — Stuart H. Mayer; Mayer & Williams PC (57) ABSTRACT

The invention relates to a method for sealing a contact point region comprising at least one contact point at an electrical line connection, wherein the line connection comprises at least one electrical line and at least one conductive element electrically connected thereto. The method starts by arranging a shrink tube on the outer circumference of the contact point region, in a first region extending over the contact point region on both sides in the longitudinal direction. This is followed by heating the shrink tube to shrinking temperature. During the heating of the shrink tube, an inductive heating of the electrical conductor is additionally performed, at least in the contact point region, and so hotmelt adhesive arranged inside the shrink tube and/or on the outer circum-
(Continued)

ference of the contact point region is heated to its melting temperature. The invention also relates to a device for sealing a contact point region and to a sealing at such a region.

8 Claims, 3 Drawing Sheets (51) Int. Cl.
*H01R 4/02* (2006.01)
*H01R 4/72* (2006.01)

(58) Field of Classification Search
USPC .................................................. 156/86, 282
See application file for complete search history.

(56) References Cited

U.S. PATENT DOCUMENTS

| 5,579,575 | A | * | 12/1996 | Lamome | ............ | H01R 4/723 |
| | | | | | | 174/88 C |
| 6,308,732 | B1 | | 10/2001 | Herndon | | |
| 6,677,529 | B1 | | 1/2004 | Endacott | | |
| 8,471,148 | B2 | | 6/2013 | Steinich | | |
| 9,799,970 | B2 | | 10/2017 | Kalass | | |

FOREIGN PATENT DOCUMENTS

| DE | 199 60 266 A1 | 6/2001 | | |
| DE | 101 38 104 A1 | 3/2002 | | |
| DE | 10 2009 041 255 B3 | 2/2011 | | |
| EP | 2 922 145 A2 | 9/2015 | | |
| WO | 93/20596 | 10/1993 | | |
| WO | 1997/023924 A1 | 7/1997 | | |
| WO | WO98/21796 | * 5/1998 | ............ | H02G 15/013 |

OTHER PUBLICATIONS

English translation of International Search Report dated May 31, 2017 issued in connection with corresponding International Application No. PCT/EP2017/053019 (2 pages total).

* cited by examiner

METHOD AND DEVICE FOR SEALING CONTACT POINTS AT ELECTRICAL LINE CONNECTIONS

FIELD

The present invention relates to a method and a device for sealing a contact point area, having at least one contact point, at an electrical line connection. The line connection includes an electrical line, which in turn has at least one electrical conductor with conductor insulation, and at least one electrically conductive element that is connected to the electrical line. When the line connection is being established, the electrical conductor has no conductor insulation in the contact point area; i.e., the metallic conductor material is exposed. The electrically conductive element may, for example, be a second electrical line, an electrical connector, an electrical terminal contact, or the like.

The method according to the invention is suitable in particular for line connections that have electrical lines with multiple electrical conductors. The electrical lines are designed as single- or multicore stranded wire lines, for example. One example of an application of the method according to the invention is the sealing of contact points in cable harnesses for vehicle electrical systems.

In electrical devices, for certain applications there is a risk that liquid media such as water or oil may enter the device via an electrical line that is connected to the device. The infiltrating medium may penetrate in the forward direction between the cable sheathing and the individual wire insulations or between the wire insulation and the metallic wire core via capillary effects. For lines made up of multiple single strands, medium may pass into the line connection or spaces between the strands and cause corrosion at that location, which adversely affects the conductance of the connecting point and of the conductor, until ultimately the electrical conductor disintegrates.

The use of butt connectors is known for achieving a longitudinal wire moisture barrier for electrical lines. In addition, sealant may be introduced via vacuum processes. Alternatively, capillary-tight lines may be used, although they are costly.

BACKGROUND

DE 38 71 607 T2 discloses a method for extending the service life of a multicore electric power cable. In this method, the interspaces within the cable are filled with a curable mixture that seals against water. This mixture is subsequently cured to form a non-flowing state.

DE 101 38 104 A1 discloses a method for sealing an electrical wire having multiple individual wire strands that are situated in external insulation. A segment of the external insulation is first removed from the wire to expose an appropriate section of the wire strands. The wire strands are subsequently deformed and bonded together in at least a portion of the section in order to form a solid wire segment without gaps in flow. The latter-mentioned step may be implemented, for example, by ultrasonic welding, laser beam welding, or electron beam welding of the wire strands in the exposed section.

DE 10 2009 041 255 B3 describes a method for manufacturing an electrical line having a longitudinal water barrier. In a first step, the line is severed at the position provided for the longitudinal water barrier. The sheathing of the line in the respective end area is subsequently removed. This is followed by electrically conductive soldering of the mutually corresponding wire cores of the two cable ends. For this purpose, the core ends are soldered on the opposite ends, which are designed as solder pads, of a strip-shaped conductor track, and which are adjacently situated on a shared circuit board and separated from one another by slots in the circuit board. The circuit board together with the connected cable ends is inserted into a mold. Seal-tight casting or extrusion coating of the entire connecting area with plastic subsequently takes place from the sheathing of one line end to the sheathing of the other line end.

A method for electrically connecting two line ends of electrical lines is known from EP 2 922 145 A2. In a first step, the stripped line ends are inserted into a connecting sleeve. At least one of the line ends is situated in a chamber of the connecting sleeve. The chamber is sealed off from the other line end by a partition wall. A sealing element with a tube mounted thereon is preferably inserted into the chamber of the connecting sleeve in such a way that the tube protrudes axially outwardly from the chamber. The tube protruding from the chamber is subsequently inverted over the connecting sleeve, so that the tube sheathes the connecting sleeve. The tube, designed as a heat shrink tube, is thermally shrunk onto the connecting sleeve.

DE 693 24 913 T2 describes a method for establishing a soldered connection between a plurality of wires. For this purpose, an initial connection is established between the wires by inserting them into a connector. The connector includes a sleeve that is dimensionally recoverable under heat, a connecting element, mounted inside the sleeve, that is heatable by induction, and a solder insert that is in thermal contact with the connecting element. The connector is subsequently heated. For this purpose, the connecting element is exposed to an alternating magnetic field, so that the connecting element is heated by induction, in order to melt the solder insert. At the same time, the exterior of the sleeve is heated by hot air or infrared radiation. In addition, sealing elements are used that are made of a meltable polymeric material and that are not situated in the contact point area. The sealing elements are induced to melt by the hot air.

The use of shrink tubes with hot-melt adhesive is also well known from practice. These shrink tubes are shrunk onto the contact point area via external energy input. The aim is for the hot-melt adhesive, present on the inner side of the heat shrink tube, to be pressed by the pressure of the heat shrink tube into the cavities that are present. To increase the adhesive volume, hot-melt adhesive may be applied to the contact point area, or adhesive moldings may be affixed to the contact point area. One disadvantage of this method is that, due to the good thermal conductivity of the electrical conductor, the electrical conductor material is not sufficiently heated, and the hot-melt adhesive cools excessively before it penetrates into the innermost cavities. The hot-melt adhesive hereby loses its fluidity and thus can no longer penetrate into all cavities, resulting in inadequate sealing of the connecting point. This problem occurs in particular with fairly complex line connections, i.e., with an increasing number of lines, and fairly large line cross sections. In addition, seal-tightness is achieved only in the immediate contact point area. Only limited seal-tightness is achievable in the adjoining areas. The heating of the heat shrink tube from the outside, which is practiced in the prior art, also has the disadvantage that the electrical conductor to be sealed does not reach the maximum temperature until the end of the process. The heat shrink tube shrinks, while the conductor material is not yet sufficiently heated at the location to be sealed, and upon contact with the heat shrink tube, the adhesive cools and thus loses fluidity. Furthermore, a relatively long heating process is necessary until thorough heating is achieved.

An electrical connector for electrically connecting at least two electrical conductors is described in WO 1997/023924 A1, for example. The connector includes a heat shrink tube having an inner coating of hot-melt adhesive. The connector is heated by induction, with initial melting of a, solder, followed by melting of the hot-melt adhesive and the heat shrink tube.

SUMMARY

The object of the present invention, therefore, is to provide a method and a device for sealing a contact point area, having at least one contact point, in electrical line connections, which allow improved sealing, in particular also for fairly complex line connections and fairly large line cross sections. In addition to the sealing in the vicinity of the sealing point, the aim is also to achieve longitudinal wire core seal-tightness, in particular not only between the insulation and the electrical conductor, but also between individual wire cores within a stranded wire.

This object is achieved by a method according to appended claim 1, and a device according to claim 10.

The method according to the invention comprises the following steps: After the electrical line connection has been established from an electrical standpoint, for example by welding multiple electrical conductors, a heat shrink tube is initially situated on the outer circumference of the contact point area, in a first area extending in the longitudinal direction on both sides of the contact point area. The first area extends beyond the contact point area. The heat shrink tube is subsequently heated to the shrinkage temperature. It is essential to the invention that during the heating of the heat shrink tube, inductive heating of the electrical conductor takes place at the same time, at least in the contact point area. As the result of heating the heat shrink tube from the outside and simultaneously inductively heating the electrical conductor (from the inside), hot-melt adhesive applied inside the heat shrink tube and/or on the outer circumference of the contact point area is heated to its processing temperature.

The electrical conductor is preferably inductively heated in the contact point area in such a way that the temperature on its outer circumference and also in its core is greater than or equal to the melting temperature (processing temperature) of the hot-melt adhesive. In this way, the areas to be sealed within the electrical conductor, also between the wire cores of a conductor strand, reach a sufficiently high temperature that the liquefied hot-melt adhesive does not prematurely solidify at that location, but instead has better penetration into the cavities of the electrical conductor and provides a seal there. The heat generated at the electrical conductor by induction is simultaneously transmitted to the conductor insulation close to the contact point, so that the conductor insulation may be melted in a targeted manner. This procedure thus assists with the complete sealing between the line insulation and the conductor, and ensures that the adhesive permanently remains in the cavities in the core area of the connection.

A significant advantage of the method according to the invention lies in the fact that direct heating of the conductor material takes place via additional inductive heating. The targeted energy input is determined by an induction frequency that is coordinated with the conductor material, the inductor geometry, the preferably locally settable density of the quantity of energy, and the application time. The additional induction heating ensures that the temperature within the heat shrink tube increases. The hot-melt adhesive may thus maintain its fluidity, necessary for optimal processability, all the way to the interior of the electrical line. For this purpose, a hot-melt adhesive should be selected whose optimal fluidity is in the range of the melting point of the conductor insulation. The hot-melt adhesive may thus penetrate optimally into all cavities and provide for a good sealing effect. This is advantageous in particular for stranded wire lines, since the hot-melt adhesive reaches up to the capillary of the stranded wires, so that capillary-tight lines may be achieved with little effort. By means of inductive heating, the conductors may be heated more intensely as well as locally, and also more precisely with regard to the temperature. This has the advantage that hot-melt adhesives having a higher melting point and a lower viscosity at high temperatures may be used. Thus, even at elevated operating temperatures, there is no risk that the hot-melt adhesive may liquefy and flow out. It has been shown in practical tests that according to the invention, types of hot-melt adhesive may be utilized that have melting temperatures high enough that during subsequent operation, temperatures in the range of 150° C. are easily allowable. However, no limitation on the stated temperature range is intended, and higher operating temperatures are certainly possible. Reliable sealing may thus be ensured, even at such high operating temperatures. Additional sealing measures are not necessary.

The method according to the invention, with little effort, allows reliable sealing of contact points, in particular also for complex line connections and for applications with increased requirements for heat resistance and under harsh environmental conditions, for example in the engine area of internal combustion engines.

A heat shrink tube having an inner coating of hot-melt adhesive, which has an optimal processing viscosity at approximately 200° C. and which maintains its position at temperatures of approximately 150° C., is preferably arranged on the contact point area. Alternatively or additionally, hot-melt adhesive may be applied, at least in the contact point area, prior to arranging the heat shrink tube. The application of additional hot-melt adhesive has the advantage that, unlike an adhesive provided in the heat shrink tube, it is not crosslinked and therefore has better flow properties and adhesive properties. The separate application may take place by direct coating with adhesive, or by affixing an adhesive film or moldings to the contact point area.

There is also the option for arranging a hot-melt adhesive molding on the contact point area. The hot-melt adhesive preferably has a processing temperature within the melting range of the conductor insulation. Use of such a hot-melt adhesive results in melting of the conductor insulation in the region immediately adjoining the contact point area, so that this region may likewise be reliably sealed. For multicore conductors, the conductor insulation fuses together and provides for additional sealing.

It has proven to be advantageous when an outer border area of the heat shrink tube is cooled while the heat shrink tube and the electrical conductor are being heated. Damage to the conductor insulation in the border area of the heat shrink tube may be reliably avoided by the cooling. However, cooling is not absolutely necessary, since the temperature gradient at the end of the heat shrink tube is sometimes already sufficient for no damage to the conductor insulation to occur. For line connections in which electrical lines are provided on only one side, it is sufficient to cool the end of the heat shrink tube in which the electrical lines are situated, since this is the only location where there is a risk of damage to the conductor insulation.

The heat shrink tube may preferably be situated at the contact point area of a line connection that includes at least two electrical lines. The electrical lines in turn have at least one electrical conductor, preferably multiple electrical conductors, with conductor insulation. The electrical conductors in the contact point area initially have no conductor insulation, or the conductor insulation is removed from them when the electrical connection is being established. The two electrical lines may be connected to one another via an electrical connector. The electrical conductors are copper conductors, for example.

Alternatively, the heat shrink tube may also be used for sealing the contact point area of a line connection that includes at least one electrical line, and an electrically conductive element that is designed as an electrical connector or electrical terminal contact.

The rapid, locally variable temperature in the first area, which is necessary for this purpose, is made possible by the combination of heating the heat shrink tube and the inductively produced heating of the conductor. To this end, the invention provides a device which delivers heat to the heat shrink tube via a heat source and at the same time generates a magnetic field in which the electrical line is present in order to heat same via the resulting induction heat. The device according to the invention includes, first of all, a heat source for heating the heat shrink tube to the shrinkage temperature. The heating of the heat shrink tube may take place in a manner known per se, for example by use of hot air or infrared radiation.

The device also includes an induction unit for inductively heating the electrical conductor, at least in the contact point area, to a temperature that is optimal for the processability or melting of the hot-melt adhesive.

The magnetic field that is generated by the induction unit may vary in intensity in different sections, so that various temperature profiles are present adjacent to the contact point on the line.

The parameters that are required for the method are determined as follows, for example. First, the energy required by the induction unit is roughly determined by means of adjustment parts. This takes place optically, for example via a thermographic measurement. The parameters of time and temperature, needed for the hot air shrinkage, are then determined by testing. The two processes are combined in the following discussion. A sample part is produced. The heat shrink tube is removed, and the degree of melting of the conductor insulation is assessed. Depending on the result, the energy of the induction unit is adapted if necessary. This procedure is carried out until the desired result is obtained. Alternatively, other automated processes for determining the particular appropriate parameters may be used.

The device according to the invention is preferably equipped with a cooling device with which the outer boundary areas may be cooled if necessary.

BRIEF DESCRIPTION OF THE DRAWINGS

Preferred applications of the method according to the invention are explained in greater detail below with reference to the appended drawings. Also described in greater detail are the individual method steps that are carried out to provide these preferred applications. The drawings show the following.

DETAILED DESCRIPTION

The line connections 02 shown in the figures each include at least one electrical line 03 and an electrically conductive element that is connected to the electrical line 03. The electrically conductive element may be designed as an electrical conductor 04, an electrical connector 12, or an electrical terminal contact 14, for example.

Figure 1:
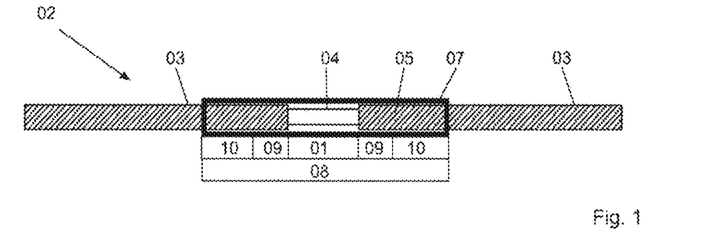
FIG. 1 shows a sealed contact point area of a line connection according to a first embodiment.

FIG. 1 shows a sealed contact point area 01 of a line connection 02 according to a first embodiment. The line connection 02 includes two electrical lines 03. The electrical lines 03 each have an electrical conductor 04 with conductor insulation 05. Both lines 03 are connected to one another in the contact point area 01. The electrical conductors 04 have no conductor insulation 05 in the contact point area 01. There is preferably a weld joint, produced by ultrasonic welding, for example, between the two electrical conductors 04. In the exemplary embodiment shown, the lines 03 each have one electrical conductor 04. Of course, the lines 03 may also include multiple conductors 04. The conductors 04 are preferably stranded wire conductors. Likewise, multiple lines 03 that are connected to one another in the contact point area 01 may also be situated on one or both sides. Alternatively, this could be a continuous electrical line 03 that is free of conductor insulation 05 in the contact point area 01.

For clarification, it is pointed out that the type of electrical conductor and the type of connection are not important for implementing the invention. In the simplest case, the electrical line may also be a one-piece continuous line whose insulation in one section has been removed or damaged, so that there is an exposed contact point area at which a seal according to the invention is to be produced.

A heat shrink tube 07 that extends on the outer circumference of the contact point area 01 in a first area 08 that runs in the longitudinal direction of the contact point area 01 is used for sealing the contact point area 01 of the line connection 02. The first area 08 extends beyond the contact point area 01 on both sides.

The seal on the contact point area 01 is produced via the method according to the invention, as described below. The heat shrink tube 07 is arranged on the outer circumference of the contact point area 01 in a first step. The length of the heat shrink tube is selected so that the heat shrink tube 07 extends beyond the contact point area 01 on both sides. The heat shrink tube 07 preferably has an inner coating of hot-melt adhesive. Additionally or alternatively, prior to arranging the heat shrink tube 07, hot-melt adhesive may be applied directly to the contact point area 01 or positioned on the contact point area 01 in the form of a hot-melt adhesive molding. The hot-melt adhesive preferably has a processing temperature in the melting range of the conductor insulation 05.

The heat shrink tube -07 is subsequently heated to the shrinkage temperature, preferably by hot air or infrared radiation. During the heating of the heat shrink tube 05 [sic; 07], the electrical conductors 04 at the same time are inductively heated, at least in the contact point area 01. The hot-melt adhesive present in the contact point area 01 is thereby heated to its processing temperature, and the hot-melt adhesive meets the preheated conductor material, so that the flowability of the adhesive is maintained and the adhesive is thus able to penetrate into all cavities and provide a good sealing effect.

While carrying out the method according to the invention, in the contact point area 01 the conductor material may be heated to temperatures in the range of 210 to 300° C., for example. In the second area 09, the temperature of the conductor 04 should still be high enough that melting of the conductor insulation 05 is possible in the second area 09. In contrast, in the outer border area 10, the aim is for the temperature to be low enough that no damage results to the conductor insulation 05 in this area. For this purpose, the temperature in the outer border area 10 should preferably be below the melting range of the conductor insulation 05. The outer border area 10 may be additionally cooled, for example with cold air, in order to control the temperature at the border area to an appropriately low level. Cooling may be dispensed with when, due to the temperature gradient, the temperature in the outer border area 10 is already below the melting range of the conductor insulation 05.

Figure 2:
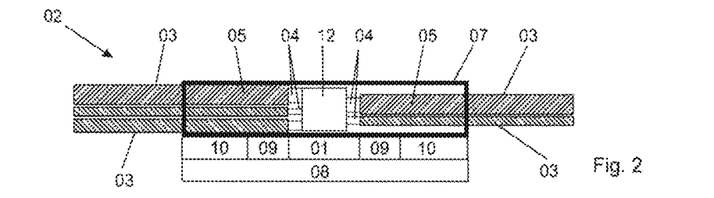
FIG. 2 shows a sealed contact point area of the line connection according to a second embodiment.

FIG. 2 shows a sealed contact point area 01 of the line connection 02 according to a second embodiment. The present line connection 02 includes electrical lines 03 that are connected via an electrical connector 12. Three electrical lines 03 are connected to a first side of the electrical connector 12, whereas two electrical lines 03 are connected to an opposite second side of the electrical connector 12. The electrical connector 12 is designed as a through connector. The electrical lines 03 each have an electrical conductor 04 that is provided with conductor insulation 05. Original conductor insulation 05 is no longer present in the contact point area 01. The sealing, and thus at the same time the electrical insulation, of the contact point area 01 of the line connection once again takes place by means of the heat shrink tube 07.

Figure 3:
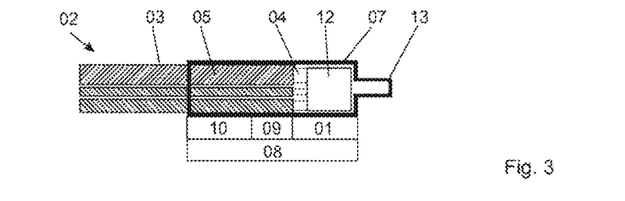
FIG. 3 shows a sealed contact point area of the line connection according to a third embodiment.

FIG. 3 shows a sealed contact point area 01 of the line connection 02 according to a third embodiment. The illustrated line connection 02 contains three electrical lines 03 that are connected to an electrical connector 12 by ultrasonic welding or by means of a crimp barrel, for example. The electrical connector 12 is designed as an end connector. The electrical lines 03 are connected to the same side of the electrical connector 12. The heat shrink tube 07 used for sealing and insulation of the contact point area 01 has an extension 13 which extends beyond the electrical connector 12 and which has a smaller diameter than the heat shrink tube 07 in the contact point area 01.

For producing the sealed contact point area 01 illustrated in FIG. 3, the heat shrink tube 07 is heated as described above. At the same time, the electrical conductor 04 is inductively heated in the contact point area 01. As a result of heating the conductor 04 and heat shrink tube 07, the hot-melt adhesive present at the contact point area 01 is brought to its processing temperature, and is thus able to penetrate into all cavities to be sealed. The heating results in melting of the conductor insulation 05 in the second area 09 adjoining the contact point area 01, thereby achieving additional sealing in the second area 09. However, the outer border area 10 adjoining the second area 09 is not damaged, since the temperature at that location is kept lower.

Figure 4:
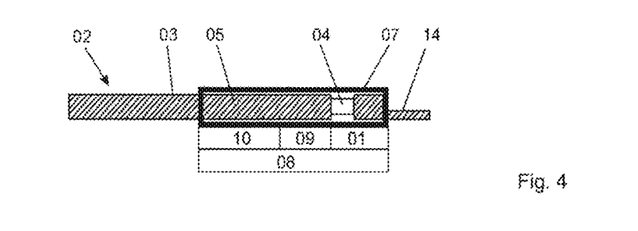
FIG. 4 shows a sealed contact point area of the line connection according to a fourth embodiment.

FIG. 4 shows a sealed contact point area 01 of the line connection 02 according to a fourth embodiment. The line connection 02 includes an electrical line 03 that is connected to an electrical terminal contact 14. The electrical terminal contact 14 may be a cable lug or a crimp contact, for example. A heat shrink tube 07 is used once again for the sealing.

Figure 5:
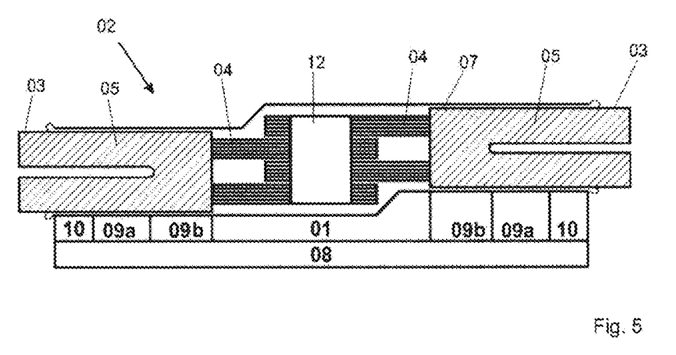
FIG. 5 shows a sealed contact point area of the line connection according to a fifth embodiment.

FIG. 5 shows a modified embodiment of the line connection. The electrical connector 12 is once again situated between the total of four electrical lines 03 (two on each side) in order to electrically connect all electrical conductors 04 to one another. The contact point area 01 includes the electrical connector 12, in the present case an ultrasonically welded section, and the stripped sections of the electrical conductors 04. The length and width of the electrical connector 12 result from the particular specifications for the application, taking into account the welding machine used. The hot-melt adhesive used is introduced into the cavities between the conductors in the contact point area 01. The aim is to achieve a capillary seal; this is possible only via the introduction of adhesive in this area. In the example illustrated here, the second area 09 is divided into a primary sealing area 09a and a secondary sealing area 09b. In the primary sealing area 09a adjoining the outer border area 10, the hot-melt adhesive provides for gluing of the heat shrink tube 07 to the conductor insulation 05. Due to the heating of the conductor insulation 05, gas-tight melting of the insulation material between the individual electrical lines 04 also occurs in the secondary sealing area 09b adjoining the contact point area 01. For this purpose, a heat input profile is created with the aid of the inductor and optional lateral cooling air; the heat input profile results in a higher temperature in the secondary sealing area 09b than in the primary sealing area 09a, the temperature in the secondary sealing area 09b being determined by the melting temperature of the insulation material. In the secondary sealing area 09b the line insulation 05 fuses together, resulting in a seal between the lines 03. On the outer circumference, the line insulation in this section forms a shared insulation sheathing, which toward the outside is joined to the hot-melt adhesive. The hot-melt adhesive seals between the heat shrink tube 07 and the shared insulation sheathing of the line bundle.

In the border area 10, the temperature during the process is instead selected so that no change in the mechanical and optical properties of the insulation occurs. Neither curing of the insulation nor melting or crack formation is desired in this section. This temperature control is achieved by the inductor supplying little or no energy in the border area 10, and if necessary, cooling by supplying cooling air.

Figure 6:
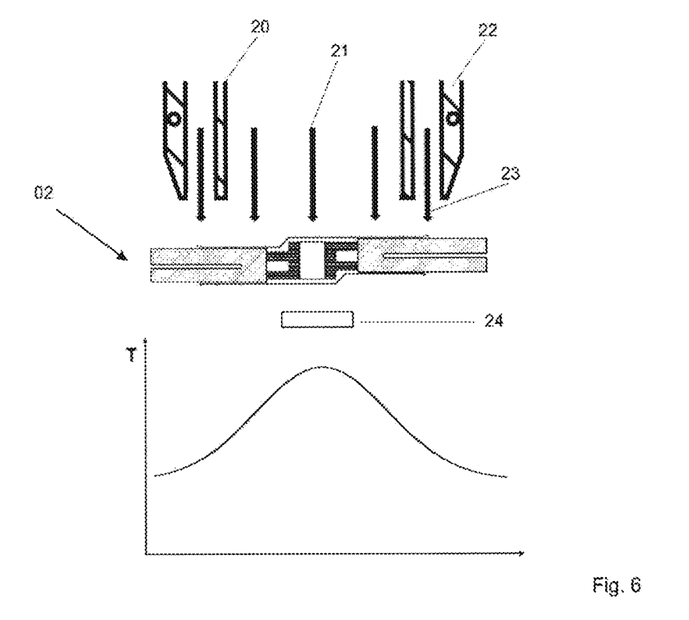
FIG. 6 shows a schematic illustration of a device for producing the sealed contact point area according to FIG. 5, together with the resulting temperature curve.

FIG. 6 shows a schematic illustration of a device for producing the sealed contact point area as illustrated in FIG. 5. A hot air feed 20 which conducts heated air 21 onto the section of the heat shrink tube 07 to be heated is situated above the line connection 02. Alternatively or additionally, infrared radiation could be used. To avoid an undesirable temperature increase in the outer border area, a section of cooling air feed 22 through which cool air 23 is blown in is situated on both the right side and the left side of the hot air feed 20. Lastly, an inductor 24 is provided, having a design that is generally known and used for the input of inductive energy into the electrical conductor. FIG. 6 also schematically shows the curve of the temperature T that results from use of the described device during the heating of the line connection in its individual sections.

Figure 7:
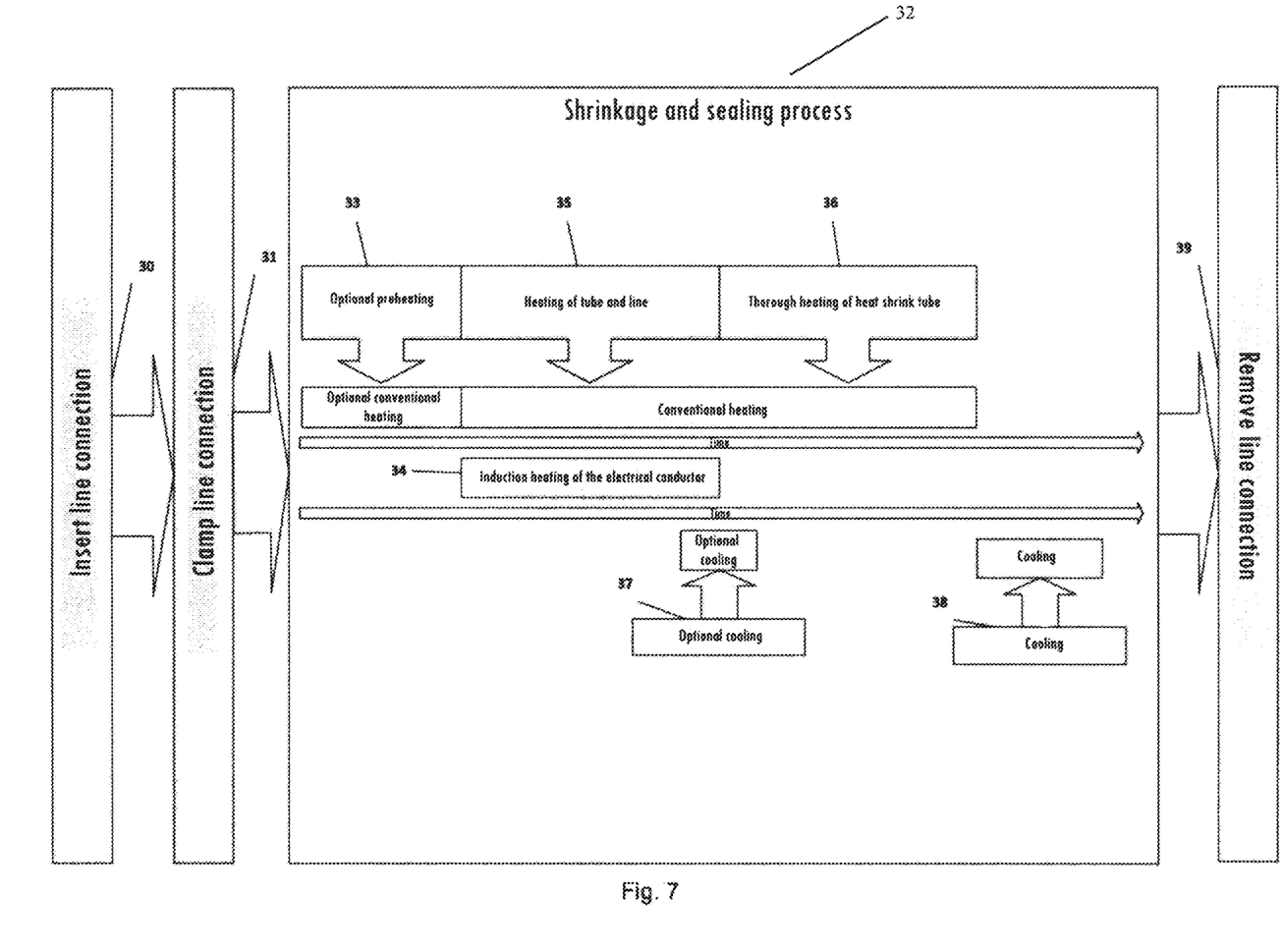
FIG. 7 shows a diagram of the essential process steps for producing the sealed contact point area.

The diagram illustrated in FIG. 7 summarizes the essential process steps that are carried out for producing the sealed contact point area. The line connection in the above-described device is inserted and clamped in place in preparatory steps 30, 31. During the actual shrinkage and sealing process 32, the following steps proceed in chronological order: Optional preheating may take place, if necessary, in step 33. This is always advisable when the air gap between the heat shrink tube and the electrical line is large, and the aim of the preheating is to place the heat shrink tube against the line. The induction heating is initiated in subsequent step 34. At essentially the same time, the heat shrink tube and the hot-melt adhesive are heated by hot air, for example, in step 35. The electrical conductor is heated primarily by induction, which melts the conductor insulation. Due to the external heating, the heat shrink tube is heated and then shrinks, and the necessary pressure is generated for fusing the melted conductor insulation and pressing the adhesive into the cavities. Thorough heating of the heat shrink tube takes place in subsequent step 36. Due to the required thermal gradient toward the outside, after the induction it is possible that the heat shrink tube does not make correct contact, in particular in the outer boundary zones. To guarantee contact, by means of conventional heating the tube is shrunk into its required shape and air inclusions are forced out. Thus, during steps 35 and 36, conventional heating takes place continuously via a hot air feed, for example. Even during the conventional heating it may be advantageous to carry out optional cooling in step 37. Cooling of the boundary zones is necessary to achieve the required thermal gradient with a complex line connection. The copper material customarily used as an electrical conductor has good heat conduction, and quickly carries the heat to the outside. For thick copper cross sections, without cooling the conductor insulation would melt beyond the boundary zones. In contrast, with small cross sections it is possible that melting does not yet take place, even in the desired areas. Lastly, mandatory cooling takes place in step 38. Since a large amount of energy is introduced into the system, the line connection is very hot after the process and must be cooled down. This may take place actively, for example using compressed air, or passively via a holding time before further processing. In addition, cooling is advantageous, since otherwise, some materials would require finishing. Due to mechanical stress in the hot state, cracks may develop in the melt which result in leaks. When the process is complete, the line connection may be removed from the device in step 39.

LIST OF REFERENCE NUMERALS

01—contact point area
02—line connection
03—electrical line
04—electrical conductor
05—conductor insulation
06—-
07—heat shrink tube
08—first area
09—second area
10—outer border area
11—-
12—electrical connector
13—extension of the heat shrink tube
14—terminal contact
20—hot air feed duct
21—heated air
22—cooling air duct
23—cool air
24—inductor
30—insertion of the line connection
31—clamping of the line connection
32—shrinkage and sealing process
33—optional preheating
34—induction heating
35—heating of the heat shrink tube and hot-melt adhesive
36—thorough heating of the heat shrink tube
37—optional cooling
38—cooling
39—removal of the line connection

The invention claimed is:

1. A method for sealing a contact point area, having at least one contact point, at an electrical line connection, the electrical line connection including at least one electrical line and at least one electrical conductive element connected thereto, the electrical line having at least one electrical conductor with conductor insulation, which is removed in the contact point area, comprising the following steps:
   arranging a heat shrink tube on the outer circumference of the contact point area in a first area that extends in the longitudinal direction beyond the contact point area on both sides;
   heating the heat shrink tube to the shrinkage temperature from the outside via a heat source;
   during the heating of the heat shrink tube, additionally generating of a magnetic field for inductive heating of the electrical conductor in the contact point area, so that hot-melt adhesive situated inside the heat shrink tube and/or on the outer circumference of the contact point area is heated to its melting temperature;
   during the heating of the heat shrink tube, additionally inductive heating of the electrical conductor in a second area adjoining the content point area, so that the conductor insulation in said area is heated to its melting temperature.

2. The method according to claim 1, wherein the electrical conductor is inductively heated in the contact point area in such a way that the temperature on its outer circumference and also in its core is greater than or equal to the melting temperature of the hot-melt adhesive.

3. The method according to claim 1, wherein the heating of the heat shrink tube to the shrinkage temperature takes place via externally applied hot air and/or irradiated infrared radiation.

4. The method according to claim 3, wherein hot-melt adhesive is applied at least in the contact point area before the heat shrink tube is arranged.

5. The method according to claim 1, wherein a heat shrink tube having an inner coating of hot-melt adhesive is situated at the contact point area.

6. The method according to claim 1, wherein hot-melt adhesive having a melting temperature that is in the melting temperature range of the conductor insulation is applied, at least in the contact point area, and/or is guided over the heat shrink tube at the contact point area.

7. The method according to claim 1, wherein an outer border area of the heat shrink tube is cooled while the heat shrink tube and the electrical conductor are being heated.

8. The method according to claim 1, wherein the heat shrink tube is situated at the contact point area of the line connection which has at least one electrical line and an electrically conductive element that is designed as an electrical connector or electrical terminal contact.

* * * * *